April 12, 1966 W. R. PITTS 3,245,631

MECHANICAL APPARATUS

Filed Sept. 16, 1963 2 Sheets-Sheet 1

INVENTOR.
WARREN R. PITTS
BY Fred Jacob
ATTORNEY

INVENTOR
WARREN R. PITTS
BY
ATTORNEY

United States Patent Office 3,245,631
Patented Apr. 12, 1966

3,245,631
MECHANICAL APPARATUS

Warren R. Pitts, Needham, Mass., assignor to Honeywell Inc., a corporation of Delaware Filed Sept. 16, 1963, Ser. No. 309,006
6 Claims. (Cl. 242—72.1)

The present invention relates in general to new and improved reels, and in particular to collapsible tape reels wherein the tape may be removed as a coil from the reel on which it is spooled.

The advantages of collapsible reels are obvious for applications where the tape is to be removed from the reel in coiled form. In one specific application, punched paper tape is transferred from a first reel to a second reel by way of a paper tape reader. Once the data has been read out, to be used directly by a computer or to be stored magnetically, it may be desirable to retain the punched paper tape for a given time period to provide a check against subsequently discovered errors, if any. If the tape is readily removable from the second reel in its coiled form, it may be stored as such and may subsequently again be placed on a reel for additional data processing. Where the tape is not so removable from the reel, the latter must be stored with the tape. A large number of reels may thus be tied up for a considerable time period.

Collapsible tape reels have been devised in the past in which one or both tape-retaining discs separate from the hub on which the tape is coiled. The reel hub may contract or be withdrawn altogether to permit the removal of the coiled tape therefrom. The relative complexity of prior art devices for carrying out these functions, which must also be adapted to hold the tape securely during readout, has been responsible for raising the cost of such tape reels. An undue degree of skill is often necessary to install or disassemble the separable tape reel portions, which results in an expenditure of time that is inconsistent with the efficient use of the equipment. Not infrequently, relatively large forces must be applied for such assembly or disassembly of the component reel portions, especially in reels which carry large lengths of tape. These factors combine in prior art tape reels of this type to render them susceptible to damage, particularly where the reels are complex in construction.

It is the primary object of the present invention to provide a collapsible tape reel which overcomes the foregoing disadvantages.

It is another object of the present invention to provide a collapsible tape reel which is readily separated into its component portions and which may be rapidly assembled into a complete reel.

It is a further object of the present invention to provide an improved tape reel which is adapted to accept or release tape in coiled form.

It is an additional object of the present invention to provide a tape reel which is capable of holding the tape securely when assembled, yet requires only a minimal amount of force for assembly or disassembly.

It is yet another object of the present invention to provide a collapsible tape reel that is simple in construction, economical to manufacture and which is not readily susceptible to damage during assembly or disassembly.

In the present invention the foregoing objects are attained by providing separable tape reel portions each including a tape-retaining disc spaced from the other disc in parallel relationship when the reel is assembled. The aforesaid reel portions contain an annular segmented hub and a solid hub respectively, the latter engaging the annular hub to expand it outwardly in the assembled position of the reel. Means are provided to inhibit relative rotary and axial movement between the assembled reel portions. Owing to the simplicity of construction, the component reel portions are relatively immune to damage, yet they are capable of quick assembly and disassembly by a simple manual operation which requires the application of only a small force in each case.

These and other objects of the present invention, together with further features and advantages thereof, will become apparent from the following detailed specification and the associated drawings in which.

Figure 1:
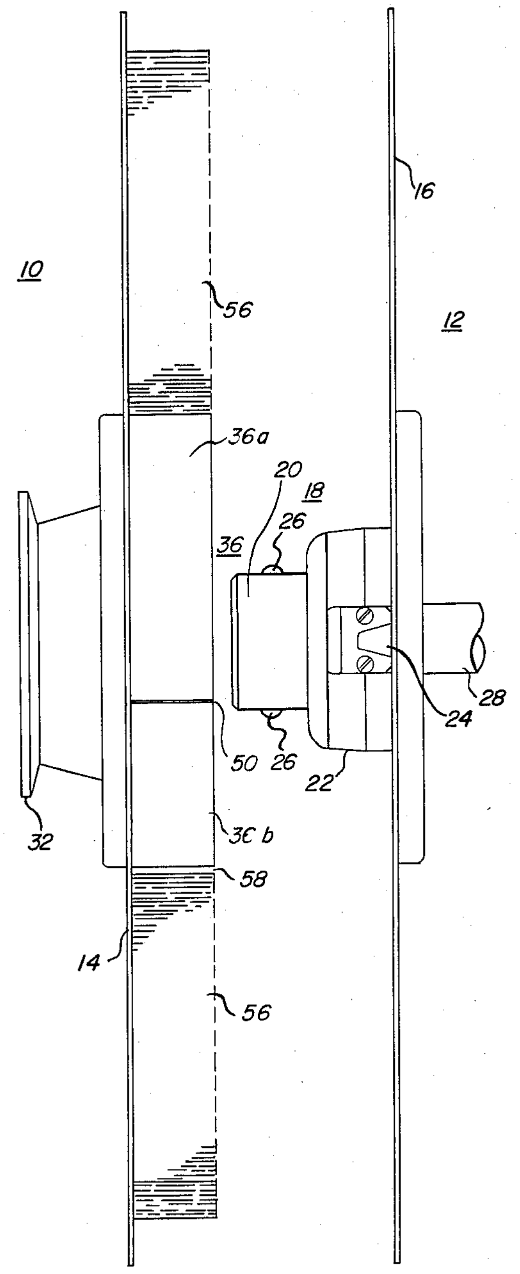
FIGURE 1 is an outline view of the disassembled reel portions.

With reference now to the drawings, the respective reel portions 10 and 12 are shown disassembled in FIGURE 1. The reel portion 10 includes an annular face disc 14 and the reel portion 12 includes an annular back disc 16 substantially identical to the disc 14. A solid hub 18 is mounted coaxial with the annular back disc 16 and forward thereof (to the left in the drawings). The solid hub 18 includes a cylindrical portion 20, as well as a camming portion which has a camming surface 22 whose diameter decreases in the forward direction. A set of wedge-shaped keys 24 is spaced at 120° intervals around the camming portion of the hub 18, each key protruding above the camming surface 22 and diminishing in width in the forward direction. The cylindrical hub portion 20 contains a pair of detents 26 spaced diametrically opposite thereon. A drive shaft 28 engages the hub 18 through the rear of the annular back disc 16 and is keyed to the hub by means of a keying arrangement 30.

Figure 3:
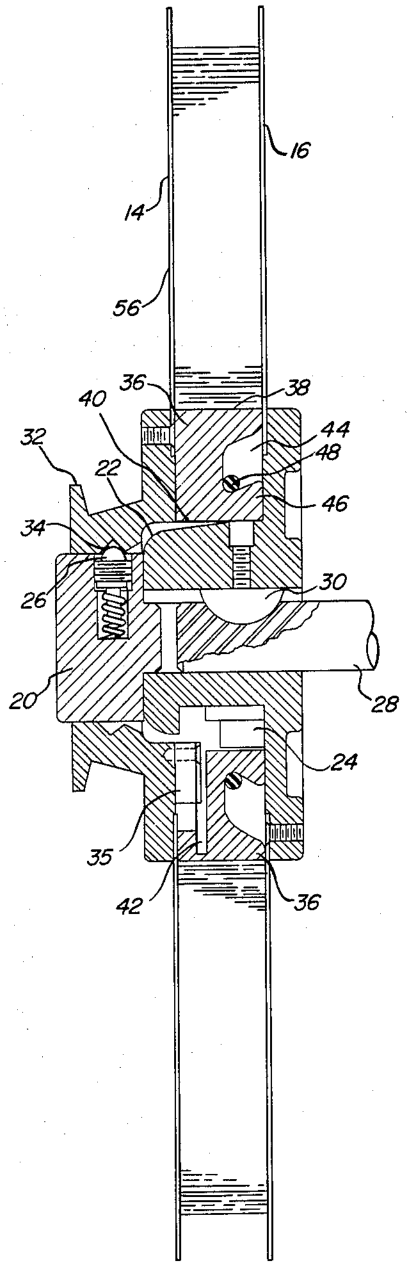
FIGURE 3 is a sectional view taken along the lines 3—3 in FIGURE 2.
Figure 4:
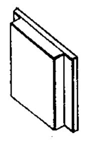
FIGURE 4 is an enlarged view of a component portion of FIGURE 3.

The annular face disc 14 includes an annular flanged handle 32 extending forward thereof. In the assembled position of the reel, as illustrated in FIGURE 3, the interior surface of the handle 32 slidably engages the cylindrical hub portion 20 which protrudes beyond the handle. A set of T-shaped keys 35, separately shown in enlarged view in FIGURE 4, is mounted on the handle 32 at 120° intervals around the bore of the face disc 14, each key extending to the rear of the disc 14. The handle 32 further includes an interior annular groove 34 which is engaged by the detents 26 in the assembled reel position to inhibit relative axial movement between the reel portions 10 and 12.

The annular face disc 14 further includes an annular hub 36 positioned to the rear thereof and comprising three arcuate segments **36*a*, 36*b* and 36*c*, each having an arcuate outer surface 38 and an arcuate inner surface 40. Each hub segment includes a T-shaped keyway 42. The last-mentioned keyways face the annular face disc 14 and mate with the aforementioned T-shaped keys 35 to permit radial movement of the hub segments 36 with respect to the disc 14** while retaining the segments against displacement in an axial direction.

The cross-section of the arcuate hub segments 36 is illustrated in FIGURE 3 and is seen to define an arcuate slot 44 which opens to the rear and which further includes an arcuate inner retaining lip 46. A garter spring 48, or equivalent resilient means such as an elastic O-ring, is disposed in the slot 44 and urges the hub segments 36 into mutually abutting relationship, as shown at line 50 in FIGURE 1. Each hub segment 36 further includes a wedge-shaped keyway facing the common axis and designated in the drawings by the same reference numeral as the corresponding key 24, with which it mates to permit relative axial movement between the reel portions 10 and 12 while inhibiting relative rotary movement therebetween. The hub segments **36*a* and 36*c* further include cut-outs 52**, each having a slot at the outer surface 38 to permit the insertion of a folded tape leader when tape is to be spooled onto the assembled reel.

As previously explained, the reel portion 12 is normally mounted on the drive shaft 28 and remains in place when the reel is disassembled. The arcuate segments of the annular hub 36 on the disassembled reel portion 10 abut each other due to the action of the garter spring 48, as shown at 50 in FIGURE 1. In order to assemble the reel, the reel portion 10 is moved to the rear along a common axis with the solid hub 18 so that the latter enters the annular hub 36. If the wedge-shaped keys 24 are aligned with their corresponding keyways located in the inner surfaces 40 of the annular hub segments, the cylindrical hub portion 20 will slide forward to protrude from the annular flanged handle 32.

Figure 2:
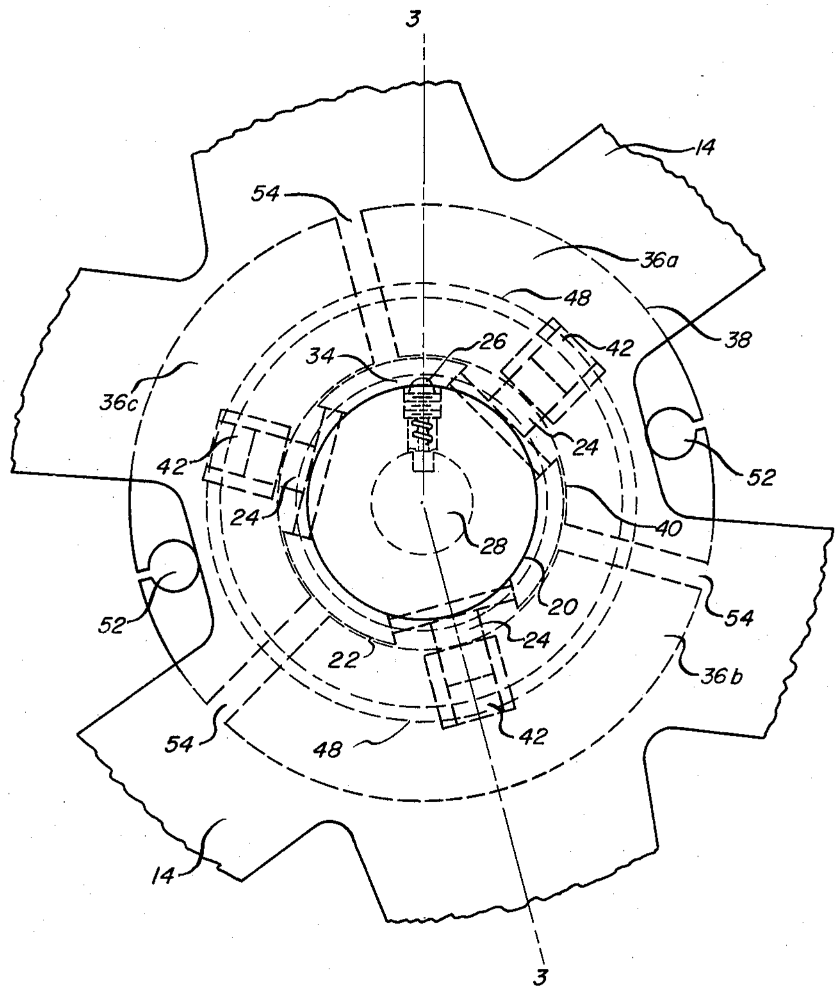
FIGURE 2 is a top view of the assembled reel.

The camming surface 22 bears against the aforesaid inner surfaces 40 of the hub segments to force the latter radially outward against the action of the garter spring 48. The movement of the hub segments is determined by the T-shaped keying arrangement 35–42, such movement continuing to a predetermined position at which the solid hub 18 is completely inserted. The outer periphery of the annular hub 36, which is composed of the outer surfaces 38, is now expanded to form a substantially cylindrical configuration. In this position the annular hub segments no longer abut each other, but are spaced from each other as shown at 54 in FIGURE 2. In the mounted position of the reel portion 14, the annular hub 36 abuts the forward surface of the back disc 16, the discs being disposed in spaced parallel relationship. The dentents 26 engage the annular groove 34 in the flanged handle 32 and inhibit relative axial motion between the respective reel portions.

The tape leader may now be threaded into the slot of the opening 52 such that, when the reel is rotated upon the application of rotary power to the drive shaft 28, the tape is spooled onto the expanded outer periphery of the annular hub 36 and is retained in place by the annular discs 14 and 16. This action causes the tape to be unwound from the originating reel, data readout occurring during the transfer of the tape between the two reels. The fully spooled tape is shown at 56 in FIGURE 3, as it appears positioned on the expanded annular hub 36.

When the tape is completely spooled on the reel the readout process is normally complete. The reel portion 10 may be removed simply by grasping the flange of the handle 32 and pressing the thumbs against the protruding cylindrical portion 20 of the solid hub 18. This causes the tape-carrying reel portion 10 to slide forward, i.e. away from the reel portion 12, while the detents 26 are depressed inward. With the removal of the camming surface 22 from contact with the interior surfaces 40 of the annular hub segments 36, the garter spring 48 becomes effective to force the hub segments into mutually abutting relationship. As a consequence, the outer perimeter of the annular hub 36 is collapsed, leaving a gap 58 between it and the coiled tape 56. By tilting the reel portion 10 downward, the tape coil may now be slid off the annular hub 36 into a storage bin, ready for future use, if needed. A subsequent assembly operation is readily carried out by sliding the portion 10 onto the portion 12 so that the reel is again ready for use.

From the foregoing description and illustration of a preferred embodiment of the invention, it will be seen that the invention provides a collapsible tape reel which requires only the alignment ofthe wedge-shaped keys with their counterpart keyways and the application of a relatively small axial force in order to be assembled and expanded. The axial force required to disassemble the reel is similarly small and need be sufficient only to overcome the action of the detents 26 which engage the annular groove 34. In the disassembled state of the reel, the annular hub 36 which carries the tape coil, has a reduced diameter so that the tape may be readily removed and preserved in its coiled form for possible future use. The invention therefore provides a simple and economically manufactured, collapsible reel which is not readily susceptible to damage and which may be quickly assembled or disassembled by a simple operation requiring the application of only a minimal amount of force.

Numerous modifications, changes and equivalents may now occur to those skilled in the art, all of which fall within the true spirit and scope contemplated by the invention.

What is claimed is:

1. An article of manufacture comprising an annular disc including a plurality of T-shaped keys spaced about its central bore, a plurality of arcuate segments positioned about said bore to define an annular hub, each of said segments having a keyway opening toward said disc and slidably adapted to engage one of said T-shaped keys for radial movement with respect to said disc, each of said segments having inner and outer arcuate surfaces defining the outer periphery of said hub, a wedge-shaped keyway in each of said inner surfaces substantially parallel to said axis, each of said hub segments having a cross-section opening to the rear to define an anular slot including an annular retaining lip; whereby said slot is adapted to accept resilient means for urging said hub segments radially inward into mutually abutting relationship, and said inner surfaces and wedge-shaped keys are slidably adapted to accept a mating structure in an axial direction capable of forcing said segments radially outward against the action of said resilient means to expand the periphery of said hub to a substantially cylindrical configuration.

2. An article of manufacture comprising an annular disc, a flanged annular handle coaxially mounted forward of said disc, said handle including an annular groove in its interior surface, a set of T-shaped keys mounted on said handle at 120° intervals around the common axis and extending to the rear of said handle, a plurality of arcuate segments positioned about the central bore of said disc to define an annular hub, each of said segments having a keyway opening toward said disc and slidably adapted to engage one of said T-shaped keys for radial movement with respect to said disc, each of said segments having inner and outer arcuate surfaces, said outer surfaces defining the outer periphery of said hub, a wedge-shaped keyway in each of said inner surfaces substantially parallel to said axis, each of said hub segments having a cross-section opening to the rear to define an annular slot including an annular retaining lip; whereby said slot is adapted to accept resilient means for urging said hub segments radially inward into mutually abutting relationship, and said inner surfaces, said wedge-shaped keys and said annular handle are slidably adapted to accept a mating structure in an axial direction capable of forcing said segments radially outward against the action of said resilient means to expand the periphery of said hub to a substantially cylindrical configuration and capable of being locked in said groove against relative axial motion.

3. A tape reel comprising a first reel portion adapted to be fixedly mounted on a drive shaft and including a first annular disc, a solid hub coaxially positioned on said first disc and including a camming surface as well as detent means, a first set of keys spaced about said camming surface, said camming surface and last-recited keys respectively tapering inward in an axial direction away from said first disc, a second reel portion including an annular inner groove adapted to be engaged by said detent means in the assembled position of said reel to inhibit relative axial movement between said reel portions, said second reel portion further including a second annular disc and a second set of keys spaced about its central bore, an annular hub coaxially positioned on said second disc and comprising a plurality of arcuate hub segments having inner and outer surfaces, each of said hub segments including a keyway mating with one of said second set of keys to permit radial movement only of said segment relative to said second disc, resilient means urging said hub segments inward into mutually abutting relationship, each of said inner surfaces including a keyway mating with one of said first set of keys to permit relative axial movement only therebetween; whereby said solid hub separably engages said annular hub in the assembled reel position and said camming surface portion bears against said inner surfaces to force said hub segments outward to a radial position in which said outer surfaces form a substantially cylindrical configuration between said discs.

4. The apparatus of claim 3 wherein the cross-section of each of said arcuate segments defines a slot opening in an axial direction away from said second disc and including a retaining lip, said resilient means comprising an annular spring retained in said slot.

5. The apparatus of claim 3 wherein said second reel portion further includes a flanged annular handle positioned on said second disc on the opposite side from said annular hub, said annular inner groove being located in said handle, said solid hub further including a cylindrical portion having said detents positioned thereon; whereby said cylindrical hub portion protrudes through said annular handle in said assembled position of said reel.

6. A tape reel comprising first and second separable components, said first component including an annular back disc, a first hub mounted coaxially with said back disc and opening rearward to accept a drive shaft, said first hub including a coaxial camming surface of decreasing diameter extending forward of said back plate, a set of wedge-shaped keys carried by said first hub spaced at 120° intervals around said axis, sad last-recited keys rising above said camming surface and diminishing in width in the forward direction, said first hub further including a cylindrical portion positioned forward of said camming surface and having a diameter less than the minimum camming surface diameter, a pair of detents at opposite sides of said cylindrical hub portion, said second reel component comprising an annular face disc substantially identical to said back disc, an annular flanged handle extending forward of said face disc slidably adapted to receive said cylindrical hub portion when said reel is assembled, said handle including an interior annular groove, a set of T-shaped keys positioned on said handle at 120° intervals about the axis thereof and extending to the rear, an annular second hub consisting of three separate, substantially identical arcuate segments each having a T-shaped keyway slidably adapted to engage a corresponding key for radial motion with respect to said face disc, the inner and outer surfaces respectively of said hub segments defining substantially cylindrical configurations at a predetermined radial position of said segments, the interior surface of each of said segments including a wedge-shaped keyway adapted to engage a corresponding key to inhibit relative rotation between said first and second reel components when said reel is assembled while permitting relative axial movement therebetween, each of said hub segments having a cross-section opening to the rear to define a slot and including an inner retaining lip, and a garter spring retained in said slot by said lip adapted to urge said hub segments radially inward into mutually abutting relationship; whereby said face and back discs are positioned parallel to each other spaced by the width of said hub segments when said reel is assembled, said cylindrical hub portion protruding forward of said flanged handle with said detents engaging said groove, and said camming surface bearing against said inner surfaces of said hub segments to force the latter to said predetermined radial position.

References Cited by the Examiner

UNITED STATES PATENTS

| | | | |
|---|---|---|---|
| 1,432,647 | 10/1922 | Way | 242—72.1 X |
| 1,451,131 | 4/1923 | Weber | 242—110.2 X |
| 2,225,987 | 12/1940 | Goldberg | 242—72.1 |
| 2,443,243 | 6/1948 | Hayssen | 242—72.1 |
| 2,575,776 | 11/1951 | White | 242—46.5 |
| 2,789,779 | 4/1957 | Loop | 242—115 |
| 2,971,721 | 2/1961 | Jones | 242—110.2 |

FOREIGN PATENTS

| | | |
|---|---|---|
| 318,342 | 9/1929 | Great Britain. |

MERVIN STEIN, *Primary Examiner.*

STANLEY N. GILREATH, *Examiner.*

W. S. BURDEN, *Assistant Examiner.*